(12) United States Patent
Dorius et al.

(10) Patent No.: US 6,421,205 B1
(45) Date of Patent: Jul. 16, 2002

(54) RECESSED SLIDER TRAILING EDGE FOR REDUCING STICTION

(75) Inventors: Lee Kevin Dorius; Donald Ray Gillis, both of San Jose; Owen Melroy; Vedantham Raman, both of Morgan Hill; Richard Lindsay Stover, Oakland; Mike Suk, Milpitas, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/256,453

(22) Filed: Feb. 23, 1999

(51) Int. Cl.[7] .............................. G11B 5/60; G11B 21/21
(52) U.S. Cl. ..................................................... 360/236.5
(58) Field of Search .......................... 360/236.5, 235.7

(56) References Cited

U.S. PATENT DOCUMENTS

| | | | | |
|---|---|---|---|---|
| 3,573,768 A | * | 4/1971 | Harris | 360/103 |
| 4,996,614 A | | 2/1991 | Okutsu | 360/103 |
| 5,047,884 A | * | 9/1991 | Negishi et al. | 360/122 |
| 5,083,365 A | | 1/1992 | Matsumoto | 29/603 |
| 5,267,109 A | * | 11/1993 | Chapin et al. | 360/103 |
| 5,331,497 A | | 7/1994 | Fuchigami | 360/126 |
| 5,499,149 A | | 3/1996 | Dovek | 360/103 |
| 5,508,862 A | * | 4/1996 | Lazzari et al. | |
| 5,634,259 A | | 6/1997 | Sone et al. | 29/603.12 |
| 5,661,618 A | | 8/1997 | Brown et al. | 360/97.02 |
| 5,673,156 A | | 9/1997 | Chen et al. | 360/97.01 |
| 5,708,540 A | | 1/1998 | Ananth et al. | 360/103 |
| 5,831,792 A | * | 11/1998 | Ananth | 360/103 |
| 5,978,176 A | * | 11/1999 | Ezaki et al. | 360/103 |
| 6,021,020 A | * | 2/2000 | Itoh et al. | 360/103 |
| 6,023,394 A | * | 2/2000 | Ito et al. | 360/103 |

FOREIGN PATENT DOCUMENTS

| | | | |
|---|---|---|---|
| EP | 627732 | | 12/1994 |
| EP | 793229 | | 9/1997 |
| JP | 59-63057 | | 4/1984 |
| JP | 1-91391 | | 4/1989 |
| JP | 1-94563 | * | 4/1989 |
| JP | 1-211383 | * | 8/1989 |
| JP | 2-310870 | * | 12/1990 |
| JP | 3-127317 | * | 5/1991 |
| JP | 3-132910 | * | 6/1991 |
| JP | 4-076875 | * | 3/1992 |
| JP | 6-203513 | | 7/1994 |
| JP | 6-203514 | * | 7/1994 |
| JP | 7-021519 | * | 1/1995 |
| WO | WO96/19803 | | 6/1996 |

OTHER PUBLICATIONS

B. Hiller et al., "Mechanism for Formation of Whiskers on a Flying Magnetic Recording Slider," IEEE Transactions on Magnetics, vol. 30, No. 4, Jul. 1994, pp. 1499–1503.

* cited by examiner

*Primary Examiner*—William Klimowicz
(74) *Attorney, Agent, or Firm*—Robert B. Martin; Lewis L. Nunnelley

(57) ABSTRACT

A slider used in a disk drive apparatus is described which has an air bearing surface and a trailing surface and a plurality of recessed steps at the trailing edge. These steps at the trailing edge greatly reduce stictional forces.

4 Claims, 4 Drawing Sheets

RECESSED SLIDER TRAILING EDGE FOR REDUCING STICTION

BACKGROUND OF THE INVENTION

1. Field of the Invention

The present invention relates to a magnetic head-slider assembly used in a magnetic disk apparatus for recording and reading back information on a magnetic disk. The head-slider assembly has improved stiction properties.

2. Description of the Background Art

A conventional structure for a magnetic slider is shown in FIG. 1a. The slider (100) has a leading surface (101), a trailing surface (102), and an air bearing surface which resides next to the disk and has a magnetic read/write element (103). As used herein, the air bearing surface of a slider shall mean the entire surface of the slider which faces the disk during operation of the disk drive. The air bearing surface usually has a upper portion (104) very close to the disk and a lower portion (106). A cross-sectional view of the trailing edge of the slider is shown in FIGS. 1b and 1c. In some sliders, the trailing surface is normal to the air bearing surface as shown in FIG 1b. In some cases, a single step (105) is formed in the air bearing surface as shown in FIG. 1c in order to better control the airflow of the air bearing or as an artifact of the manufacturing process.

The trailing edge of the slider is susceptible to accumulation of lubricant and hydrocarbon materials during the operation of the disk drive. The accumulated material can then interfere with the normal flying of the slider, generally increasing the spacing between the sensor and the disk. This increased spacing can result in a high error rate when data is retrieved from the disk. The spacing can also be reduced leading to accelerated wear. The accumulated material can also migrate back into the area of the air bearing surface when the slider comes to rest on the disk and thus increase the stiction forces at the air bearing surface during subsequent startup operation.

Stiction results from the accumulation of lubricant or hydrocarbon contaminants on the trailing edges of sliders that are flown over disks for prolonged periods of time. When the disk drive is turned off and the head comes to rest on the disk, the liquid materials can flow beneath the slider causing the slider to stick to the disk. This stiction force, if severe, can prevent the disk from starting again. As an example, if a liquid covers 2000 $\mu m^2$ of area on the air bearing surface, the effective stiction force can be 40 gm. The force is reported here as grams equivalent. The force in units of dynes can be obtained by multiplying by the acceleration of gravity. This propensity of liquids to accumulate on the trailing edge of the slider generally is more pronounced as the spacing between the flying slider and the disk is reduced. Future disk drives will have reduced spacing between the slider and the disk in order to increase areal density. For future designs requiring very high densities, the slider will be in frequent contact with the disk. Accordingly, the propensity of the slider to accumulate material at the trailing edge will increase for future applications. Thus, the stiction is a problem now and will be more pronounced in the future.

It is the object of the present invention to provide a novel slider structure which greatly mitigates these problems with stiction. Other objects and advantages will be apparent from the following description.

SUMMARY OF THE INVENTION

A general object of the present invention is to provide a slider which greatly reduces the stiction forces associated with the material buildup on the trailing edge of the slider. According to the present invention, multiple steps are formed at the intersection of the trailing edge and the air bearing surface of the slider. These multiple steps result in unexpectedly large reductions of stiction forces and also reductions in the accumulation of extraneous material on the slider. In one embodiment of the invention, two or more steps are formed at the trailing edge of either a side element or a center element slider. The trailing edge is defined as the intersection of the air bearing surface and the trailing surface. In another embodiment of the invention, the steps are formed in the trailing edge of a side element or a center element slider where the steps are formed across the entire trailing edge of the slider. In an alternative embodiment, the steps extend across the trailing edge of the slider except in the near proximity of the read/write element. In another embodiment, a disk drive apparatus is described where the disk drive comprises a disk, suspension, and slider wherein the slider has a plurality of recessed steps in the air bearing surface at the trailing edge.

DETAILED DESCRIPTION OF THE INVENTION

Figure 1A:
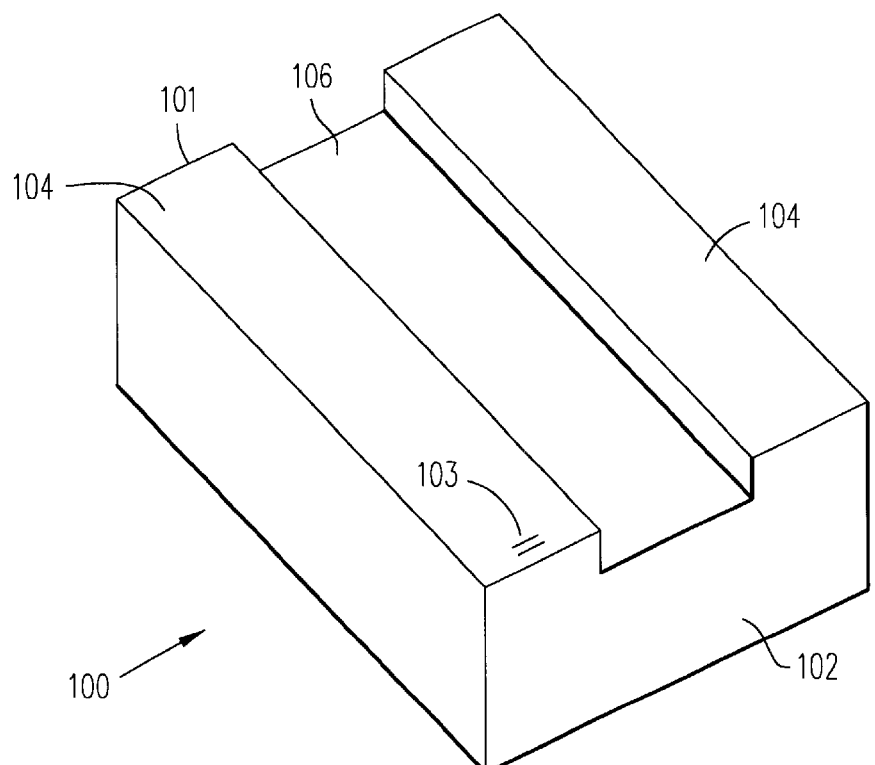
FIG. 1a is a perspective view of a present conventional slider.
Figure 1B:
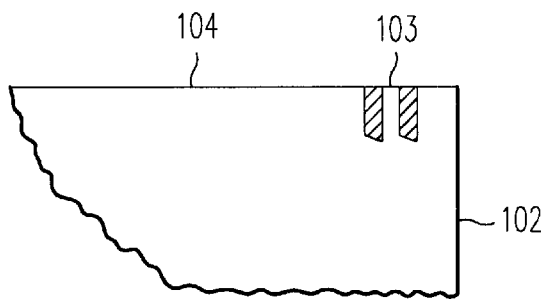
FIG. 1b is a cross-sectional view of a conventional slider with no recessed step.
Figure 1C:
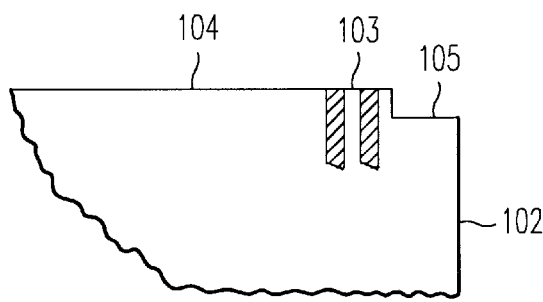
FIG. 1c is a cross-sectional view of a conventional slider with one recessed step.
Figure 2:
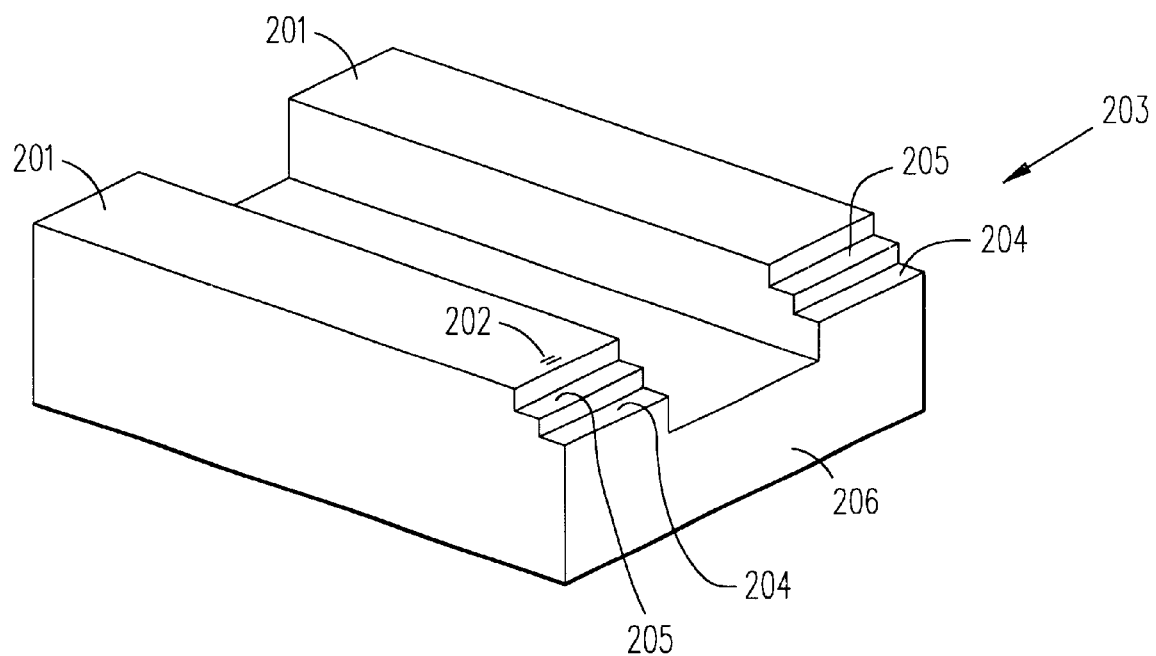
FIG. 2 is a perspective view of the present invention as instantiated on a side element slider.

Referring to FIG. 2, there is shown an embodiment of the present invention as implemented on a slider with side rails. The slider has two side rails (201), one of which may be shorter than the other. The two side rails form part of the air bearing surface. The read/write element (202) is located near the trailing edge (203) of one of the side rails. The key feature of the present invention is the combination of an upper step (205), recessed relative to the air bearing surface and at least one lower recessed step (204). The upper and lower steps are recessed to different depths relative to the air bearing surface. The location of the recessed steps are at the intersection of the air bearing surface(s) and the trailing edge of the slider.

Figure 3:
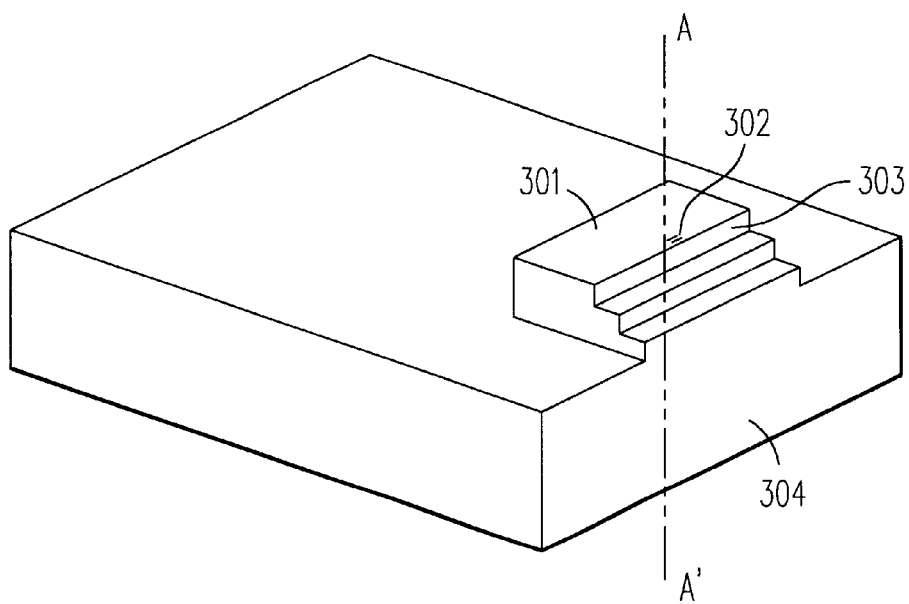
FIG. 3 is a view of the present invention as instantiated on a center element slider.

Another embodiment of the present invention where the read/write element is located in the center of the slider is shown in FIG. 3. In FIG. 3, the air bearing surface comprises a centrally located pad (301) near the trailing edge. The read/write element (302) is located near the center of the slider. The multiple steps (303) are located at the intersection of the air bearing surface (301) and the trailing surface (304). The present invention applies to both side element and center element designs. In all cases, it is important that the multiple steps be formed at the intersection of the trailing surface of the slider and the portion of the air bearing surface in proximity to the disk. This portion of the air bearing surface is called the upper surface. The lower portion of the air bearing surface is farther from the disk and may also have the multiple steps formed at the intersection with the trailing surface.

Figure 4:
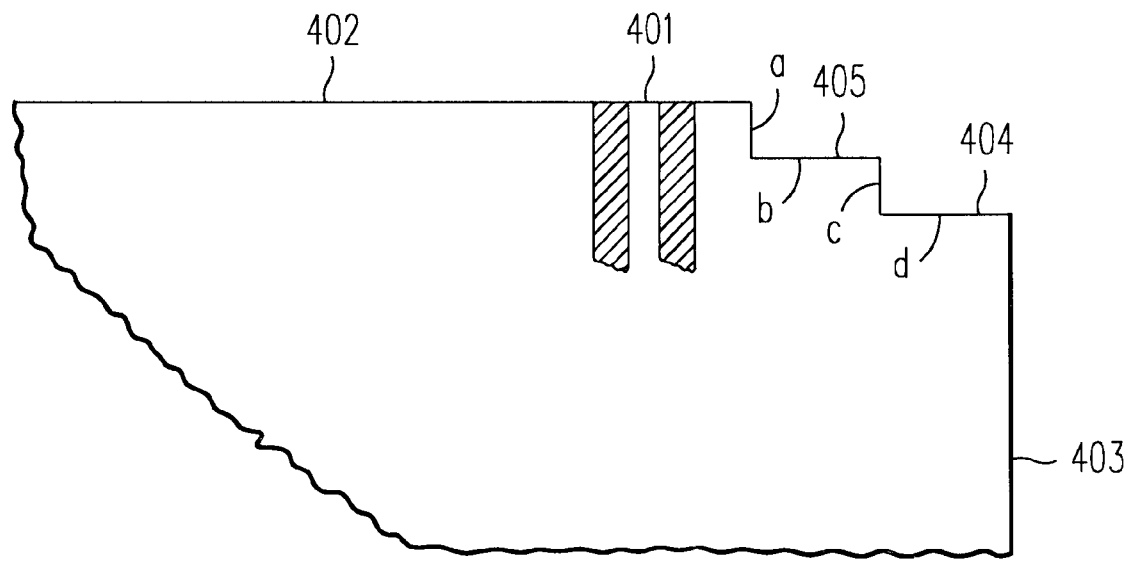
FIG. 4 is a cross-sectional view of the trailing edge of a slider showing the present invention.

A cross-sectional view along line A—A of the slider of FIG. 3 is shown in FIG. 4. The read/write element (401) is suitably located in the air bearing surface (402) near the trailing edge or surface of the slider (403). A lower step (404) and upper step (405) are shown formed at the intersection of the trailing surface (403) and the air bearing surface (402).

Figure 5:
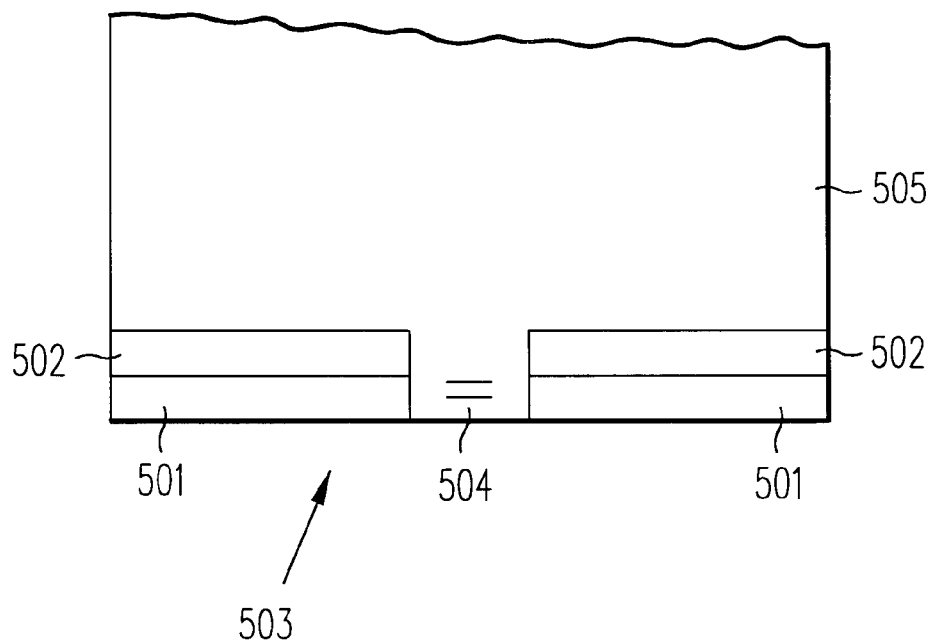
FIG. 5 is an air bearing surface view of the present invention where the recessed steps do not extend across all of the trailing edge of the slider.

In some cases where the slider is designed to be in very close spacing to the disk, it is desirable to avoid recessed steps in the immediate vicinity of the read/write elements. Accordingly, a second embodiment of the present invention is shown in FIG. 5. A portion of the air bearing surface is shown in FIG. 5 where the multiple recessed steps are not formed in the immediate proximity to the read/write element (504).

Figure 6A:
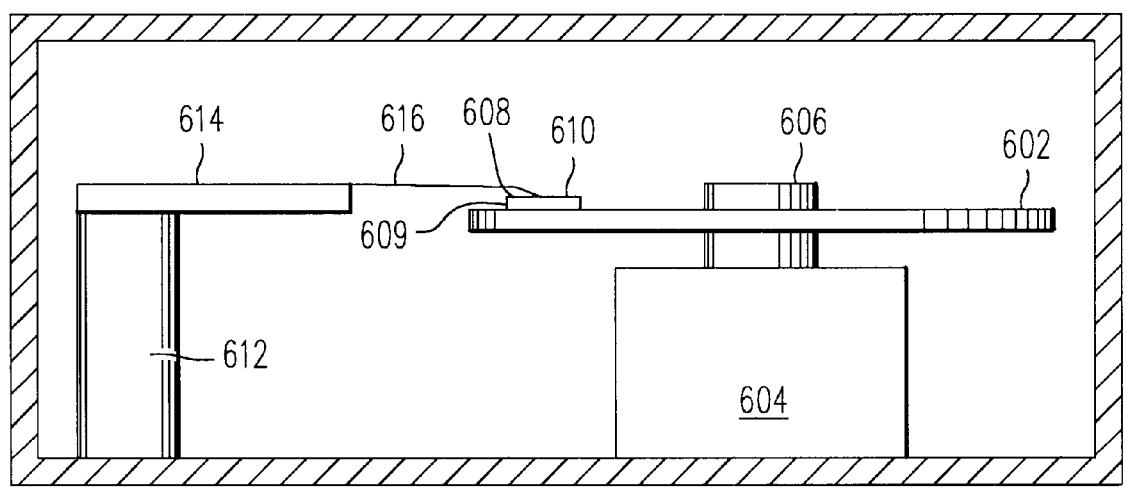
FIGS. 6a and 6b are views of a disk drive apparatus incorporating the present invention.
Figure 6B:
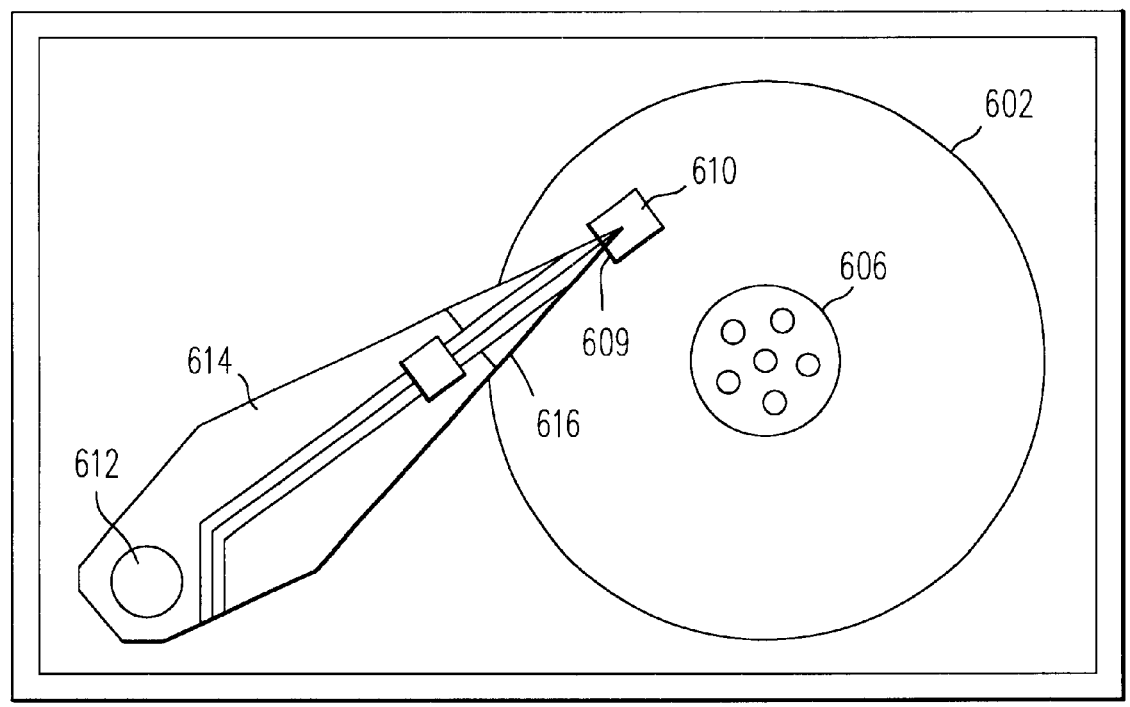

FIGS. 6a and 6b show the present invention as used in a magnetic recording disk drive. The magnetic recording disk (602) is rotated by drive motor (604) with hub (606), which is attached to the drive motor. The disk comprises a substrate, a magnetic layer, an optional overcoat layer such as carbon, and typically a lubricant layer such as a perfluoropolyether. The substrate is typically either aluminum, glass, or plastic. Some disk drives are designed such that the slider (610) comes to rest on the disk when the disk drive is stopped. In other disk drives, the slider is lifted off of the disk surface when the disk drive is turned off. The latter is preferable when the surfaces of the slider and the disk are designed to have very low roughness. This is advantageous for designs requiring frequent or continuous contact between the slider and the disk during normal operation.

A read/write transducer (608) is formed on the trailing end of a slider (610). The slider has a trailing vertical surface (609), as shown in FIG. 6a. The read/write transducer usually comprises an inductive write element and a magnetoresistive read element. The slider (610) is connected to the actuator (612) by means of a rigid arm (614) and a suspension (616). The suspension (616) provides a force which pushes the slider (610) toward the surface of the recording disk (602).

A test was designed to evaluate the propensity of slider disk contaminations to exhibit stiction forces. This test involved injecting a contaminating hydrocarbon in a chamber containing a slider and disk combination. Subsequently, the area covered by the contaminating hydrocarbon was measured. The results of this measurement is shown in Table 1.

TABLE 1

Measurements of areas of liquid on sliders

| Test # | Number of steps | Liquid area (square um) |
|---|---|---|
| 1 | 0 | 3,400 |
| 2 | 0 | 3,050 |
| 3 | 1 | 861 |
| 4 | 1 | 716 |
| 5 | 2 | none |

The data in Table 1 shows a very large reduction of the area of liquid on the air bearing surface of sliders which have two recessed steps on the trailing edge compared with the sliders with less than two.

In order to verify that the reduction of the liquid surface area also resulted in lower stiction, a separate measurement was made on some slider and disk combinations which were subjected to the same environment of introduced hydrocarbon contaminants. The stiction forces were subsequently measured. The results are shown in Table 2.

TABLE 2

Measurements of stiction forces from one and two step sliders

| Number of steps | Stiction after one hour (grams) |
|---|---|
| 1 | 15 |
| 2 | 0.7 |
| 2 | 1.5 |
| 2 | 1.6 |

Thus, multiple steps on the trailing edge of the sliders surprisingly result in approximately one order of magnitude reduction in the stiction forces.

Several well known techniques are available for fabricating the steps. typically, reactive ion etch techniques or focused ion beams can be used to generate successive, recessed steps. These techniques can be applied to the air bearing surface or from the trailing surface. Alternatively, if two separate materials are used to make the slider, a mechanical polishing process can be used to generate at least one of the steps. An example of mechanical process is lapping using a particle slurry. Commonly the bulk of the slider is made from a relatively hard ceramic material and a more thin softer layer of material such as alumina will be formed over the read/write element as a protective layer. This latter structure is more appropriate for a mechanical polishing process to generate at least one of the steps. Another machining process which can be used to generate precise steps is ultrasonic machining.

The dimensions of the steps used in demonstrating the present invention are illustrated in FIG. 4. The upper step was less than 0.5 $\mu$m deep (a) and about 18 $\mu$m long (b). The lower step was about 2 $\mu$m deep (c) and about 2 $\mu$m long (d). Multiple steps inhibit the formation and migration of accumulated liquids. For the experimental sliders, both of the steps were fabricated with reactive ion etch procedures. Although this invention has been described with respect to specific embodiments, the details thereof are not to be construed as limitations for it will be apparent that various embodiments, changes, and modifications may be resorted to without departing from the spirit and scope thereof; and it is understood that such equivalent embodiments are intended to be included within the scope of this invention.

We claim:

1. A slider for use in a disk drive apparatus, comprising;
    a support structure having a leading surface, a trailing surface, an air bearing surface having an upper portion established by a rail, and a recording transducer on the air bearing surface located proximate to the trailing surface,
    said support structure having a plurality of steps formed on the rail at the intersection of the rail and the trailing surface, said steps being recessed at least two different distances from the upper portion of the air bearing surface.

2. A slider for use in a disk drive apparatus, comprising;
    a support structure having a leading surface, a trailing surface, an air bearing surface having an upper portion established by a pad, and a recording transducer on the air bearing surface located proximate to the trailing surface, said support structure having a plurality of steps formed on the pad at the intersection of the pad and the trailing surface, said steps being recessed at least two different distances from the upper portion of the air bearing surface.

3. A disk drive apparatus, comprising:

a magnetic disk;

a motor connected to the disk;

a slider having a support structure including a leading surface, a trailing surface, an air bearing surface including an upper portion established by a rail, a recording transducer on the air bearing surface located proximate to the trailing surface, said support structure having a plurality of steps formed on the rail at the intersection of the rail and the trailing surface, said steps being recessed at least two different distances from the upper portion of the air bearing surface; and, a suspension connected to the slider which position said slider for magnetic recording on the disk.

4. A disk drive apparatus, comprising:

a magnetic disk;

a motor connected to the disk;

a slider having a support structure including a leading surface, a trailing surface, an air bearing surface having an upper portion established by a pad, a recording transducer on the air bearing surface located proximate to the trailing surface, said support structure having a plurality of steps formed on the pad at the intersection of the pad and the trailing surface, said steps being recessed at least two different distances from the upper portion of the air bearing surface; and, a suspension connected to the slider which position said slider for magnetic recording on the disk.

* * * * *